United States Patent [19]
Miller et al.

[11] 3,775,068

[45] Nov. 27, 1973

[54] GLASS POLISHING AGENT OF SODIUM ZIRCONIUM SILICATE

[75] Inventors: John B. Miller, Geneva; Marion F. Horrigan, Penn Yan, both of N.Y.

[73] Assignee: Transelco, Inc., Penn Yan, N.Y.

[22] Filed: June 23, 1971

[21] Appl. No.: 156,093

[52] U.S. Cl.................. 51/308, 51/309, 423/84, 423/332
[51] Int. Cl................................................ C09c 1/68
[58] Field of Search.................. 51/308, 307, 309; 106/57, 3, 299; 423/84, 332; 424/49, 52; 252/140

[56] References Cited
UNITED STATES PATENTS

| | | | |
|---|---|---|---|
| 2,564,522 | 8/1951 | Rohden et al. | 423/84 |
| 3,514,303 | 5/1970 | Simon et al. | 106/299 |
| 2,427,799 | 9/1947 | Maloney | 51/308 |
| 2,694,004 | 11/1954 | Coffeen | 51/308 |

*Primary Examiner*—Donald J. Arnold
*Attorney*—Shlesinger, Fitzsimmons & Shlesinger

[57] ABSTRACT

Sodium hydroxide or sodium carbonate is mixed with zircon, and heated to a temperature preferably about 2,200°F for 6 hours, and then the product is preferably wet-milled, adding phosphoric acid to control the final pH. A sodium zirconium silicate is obtained which is particularly suitable for glass polishing, and having a composition range from (0.1 $Na_2O$) ($ZrO_2$) ($SiO_2$) to (1.1 $Na_2O$) ($ZrO_2$) ($SiO_2$).

7 Claims, No Drawings

GLASS POLISHING AGENT OF SODIUM ZIRCONIUM SILICATE

The present invention relates to polishing agents, and more particularly to polishing agents suitable for polishing glass, and to a method for producing the same.

Much has been done in the field of making products, including glass polishing agents, from zirconium silicate or zirconium oxide. However, most production methods, even where practical, are costly if the desired polishing qualities are to be attained in the product.

It has been proposed to produce glass polishing compounds from zircon by mixing finely comminuted zircon with a comminuted compound yeiding alkali oxide and selected from the group consisting of $Na_2O$ and $K_2O$ and mixtures thereof, heating the mixture, extracting alkali silicate from the resultant product, and recovering the zirconia therefrom by leaching the resulting product with an aqueous solution of sodium hydroxide or potassium hydroxide or a mixture thereof, the leaching step being carried out at a temperature between 75°C and 250°C from 1 to 60 hours. It has been found, however, that it is not possible with this suggested process to produce pure zirconium oxide. In every case it has been found that the zirconium oxide obtained was not free but chemically combined with alkali and silica, and that no amount of hot caustic leaching would dissolve away water glass ($Na_2SiO_3$), to leave pure $ZrO_2$.

It has also been suggested that zircon be mixed with various amounts of alkali, and heated, to yield $ZrO_2$ plus sodium silicates, and that the sodium silicates be removed from the $ZrO_2$ by leaching with hot caustic. Tests have shown, however, that with this process complex sodium zirconium silicates are obtained which do not dissolve in hot caustic solutions.

It is known to produce zirconium oxide polishing agents from crude zirconium oxide, containing as an impurity an inflammable zirconium compound, by calcining the product under oxidizing conditions at a temperature of approximately 1,300°C until the product is rendered non-inflammable, and thereafter milling the product to a particle size usable in commercial applications.

A primary object of this invention is to provide a process for producing a zirconium polishing compound which will be relatively inexpensive.

Another object of the invention is to provide such a process which will produce a compound high in purity.

Still another object is to provide a polishing compound of the character described in particle sizes adapted for use in commercial applications.

Other objects of the invention will be apparent hereinafter from the specification and from the recital of the appended claims.

In the process of the present invention zircon is preferably dry mixed with sodium carbonate or sodium hydroxide, heated for a period of several hours, and then milled to the desired particle size preferably by wet milling and with phosphoric acid added in a quantity to obtain the desired pH of the product.

An aim is to use the least amount of soda and the least heat treatment to cause the complete reaction of all the zircon. It was found that as the amount of soda used was increased from 0.1 to 0.6 mole $Na_2O$/mole zircon, the zircon X-ray diffraction pattern lines decreased in intensity and finally disappeared when the molar ratio reached or exceeded 0.5, that is, the zircon had disappeared.

It was found further that amounts of soda up to a molar ratio of 0.63 did not improve the polishing efficiency, but were actually deleterious due to the undesirably high pH, and due to foaming in the polishing operation.

A reaction temperature range 2,000° to 2,300°F is required to complete the reaction in a reasonable time, said 6 to 12 hours. Upon heating to 2,200°F for 6 hours, and using either NaOH or $Na_2CO_3$ with dry mixing preferred as against wet mixing, satisfactory results were obtained. Dry mixing is cheaper; and no advantage was found in wet mixing. Temperatures of over 2,300°F are needlessly costly, and tend to make the product too hard to mill easily to the fine particle size which is required for glass polishing. It is preferred to mill the calcines in two steps for greater efficiency; first wet ball milling for about 24 hours, followed by wet vibratory milling for about 24 hours. Of several acids tested for pH control of the final product, we found that phosphoric acid added during the wet milling process in amounts to control the final pH to 7.0 to 8.0 was preferable.

A sodium zirconium silicate product was obtained. We have found that a sodium zirconium silicate product with a preferred composition (0.5 $Na_2O$) ($ZrO_2$) ($SiO_2$) and having an allowable composition range from (0.1 $Na_2O$) ($ZrO_2$) ($SiO_2$) to (1.1 $Na_2O$) ($ZrO_2$) ($SiO_2$) showed two unexpected results.

First of all, this calcined product shows a neutral pH range (6.5 to 7.5 pH units), indicating that the soda is locked into the structure and resists hydrolysis. This is important in glass polishing, because alkalies leached out from optical glass during polishing raise the pH of the polishing slurry to above 10.0 pH units, and must be controlled by the users with additions of acid, which adds unnecessarily to the problem of employing such a polishing agent. When these calcines were wet milled to their final particle size suitable for glass polishing, the pH did go up to 10 to 11 pH units, but it was possible readily to lower this with a modest addition of acid, preferably phosphoric acid.

Second, we have found that all of these sodium zirconium silicate calcines were milled to a size suitable for glass polishing (0.7 to 0.8 microns average size, 8 to 10 microns maximum size) performed much better in glass polishing tests than zirconium silicate (the raw material for these products), and in the preferred composition range of about 0.25 $Na_2O$ to 0.63 $Na_2O$ (molar ratio of $Na_2O/ZrSiO_4$), the products performed equal to or better than zirconium oxide polishing agents produced from crude zirconium oxide containing as an impurity inflammable zirconium compounds in which the product was calcined under oxidizing conditions at a temperature of approximately 1,300°C until the product was rendered non-inflammable and the product was then milled to a particle size of less than 5 microns for commercial use.

The results obtained were quite surprising because when zirconia of 85 to 95 percent purity is diluted with inert material, for example, silica, talc, etc., the polishing efficiency drops in relation to the percent of $ZrO_2$ present.

The preferred composition of the product of this invention is roughly 58% $ZrO_2$, 28% $SiO_2$, and 14% $Na_2O$ (zirconium silicate is 65 to 66% $ZrO_2$).

Zirconia as heretofore produced has excellent suspension properties but eventually settles out as a very hard cake. This is undesirable. It was found that it was readily possible to adjust the product of the present invention to deliver a wide range of desirable suspension and settling characteristics.

While the invention has been described in connection with different embodiments thereof, it will be understood that it is capable of further modification; and this application is intended to cover any modifications, or uses of the invention coming within the present disclosure or the recital of the appended claims.

Having thus described our invention what we claim is:

1. A finely-powdered glass polishing agent consisting essentially of a sodium zirconium silicate having the approximate formula $Na_2 0.2 ZrO_2 \cdot 2SiO_2$ and an average particle size of 0.7 to 0.8 microns with a maximum particle size of 8 to 10 microns.

2. A finely-powdered glass polishing agent consisting essentially of sodium zirconium silicate having a composition range from $(0.1 Na_2O) (ZrO_2) (SiO_2)$ to $(1.1 Na_2O) (ZrO_2) (SiO_2)$.

3. A finely-powdered sodium zirconium silicate product as claimed in claim 2 for polishing glass having a composition range from $(0.1 Na_2O) (ZrO_2) (SiO_2)$ to $(0.6 Na_2O) (ZrO_2) (SiO_2)$ and an average particle size of 0.7 to 0.8 microns with a maximum particle size of 8 to 10 microns.

4. A finely-powdered glass polishing agent having a composition of approximately 58% $ZrO_2$, 28% $SiO_2$ and 14% $Na_2O$ and an average particle size of 0.7 to 0.8 microns.

5. The process of producing a sodium zirconium silicate, finely-powdered glass polishing agent which comprises dry mixing a reactant selected from the group consisting of sodium hydroxide and sodium carbonate with zircon to obtain a ratio of 0.1 to 0.6 mole of $Na_2O$ per mole of zircon, heating said mixture to a temperature of between 2,000° and 2,300°F for from 6 to 12 hours, and then wet milling the calcined product to obtain an average particle size of 0.7 to 0.8 microns with a maximum particle size of 8 to 10 microns.

6. The process according to claim 5, wherein the reaction is effected at a temperature of 2,200°F for 6 hours.

7. The process according to claim 5, wherein phosphoric acid is added during milling to control the final pH of the product.

* * * * *